Figure 1:
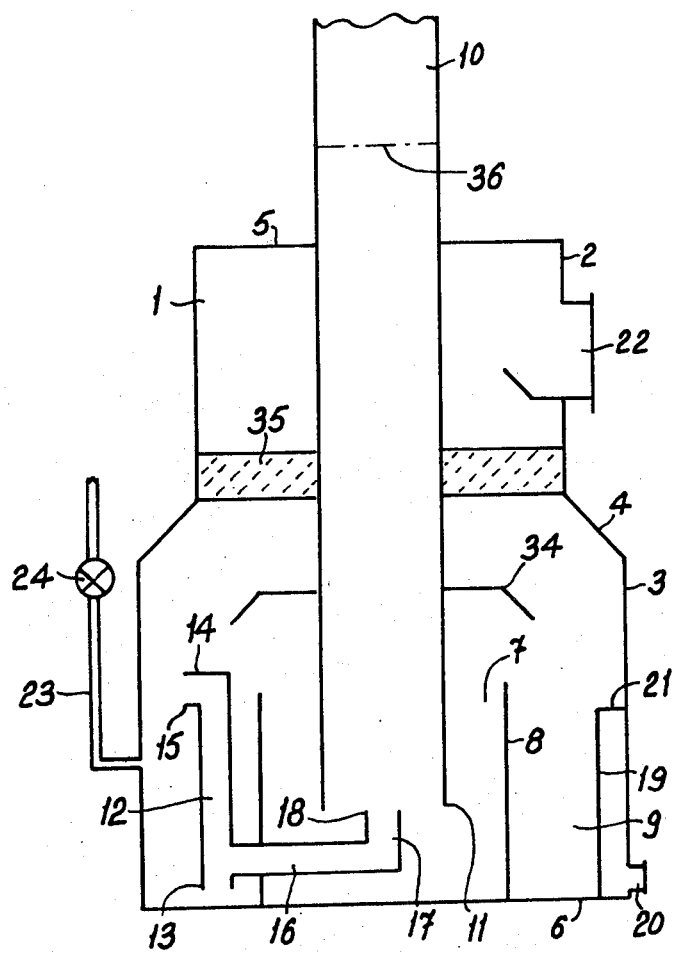

United States Patent [19]

Ball

[11] 4,411,286
[45] Oct. 25, 1983

[54] LIQUID SEAL VALVE

[75] Inventor: Gerald G. Ball, London, England

[73] Assignee: Peabody Holmes Limited, Huddersfield, England

[21] Appl. No.: 238,921

[22] Filed: Feb. 27, 1981

[30] Foreign Application Priority Data

Mar. 6, 1980 [GB] United Kingdom ................ 8007688

[51] Int. Cl.$^3$ .............................................. F16K 9/00
[52] U.S. Cl. .................................. 137/253; 137/252; 137/254
[58] Field of Search ...................... 137/247.25, 247.29, 137/247.35, 251, 252, 253, 254

[56] References Cited

U.S. PATENT DOCUMENTS

| | | | |
|---|---|---|---|
| 1,651,051 | 11/1927 | Wiggins | 137/251 |
| 3,187,765 | 6/1965 | Frank | 137/253 |
| 3,237,637 | 3/1966 | Ainsworth | 137/251 |
| 3,741,235 | 6/1973 | Ambrose | 137/247.25 X |
| 3,802,165 | 4/1974 | Wesplats | 137/254 X |

Primary Examiner—Harold W. Weakley
Attorney, Agent, or Firm—Richard D. Weber

[57] ABSTRACT

A liquid seal valve, intended in particlar to form part of an inert gas system for supplying inert gas to a storage tank in which liquid fuel may be stored, comprises a first vessel having a gas outlet therefrom, and a gas inlet pipe extending downwardly into a second vessel containing a liquid trap, the lower end of the gas inlet pipe being disposed below the level of the surface of the liquid trap when there is no gas flow through the gas inlet pipe. The second vessel communicates, in a region above the level of the surface of the liquid trap, with the first vessel, whereby gas entering the valve via the gas inlet pipe can flow via the second vessel to the gas outlet in the first vessel. Pipe means provides communication between the lower end of the gas inlet pipe and at least two regions in the first vessel, of which at least one is below and at least one is above the level of the surface of the liquid trap when no gas flows through the gas inlet pipe.

6 Claims, 5 Drawing Figures

LIQUID SEAL VALVE

This invention relates to an improved liquid seal valve, intended in particular to form part of an inert gas system for supplying inert gas to a storage tank in which liquid fuels or other dangerous chemicals may be stored.

In the operation of a sea-going, liquid fuel-carrying vessel, for example an oil tanker, explosive mixtures of hydrocarbon gases and air can exist in the cargo tanks, both during tankering and ballast voyages. The same situation can also exist in land-based storage tanks.

In order to protect such storage tanks against the risk of explosion of the tank atmosphere, it is now a recognised procedure to introduce inert gas into the tank to decrease the oxygen content and so change to safe proportions the constituents of the tank atmosphere. For this purpose, an inert gas (by which is meant a gas, such as nitrogen or carbon dioxide, or a mixture of gases, such as flue, gas containing sufficient oxygen to support the combustion of hydrocarbons) is introduced into the storage tank by means of an inert gas system which includes an inert gas plant for providing, cooling and pressurising the inert gas, and an inert gas distribution system for distributing the inert gas from the inert gas plant to the storage tank.

Since the inert gas plant of such an inert gas system usually only operates intermittently, an essential item of the system is a device for preventing backflow of the storage tank atmosphere. Such a backflow can occur, for example, due to a rise in temperature of a storage tank which has been inerted with inert gas, giving rise to expansion of the tank atmosphere. The inert gas system would, of course, comprise one or more valves for venting the storage tank to atmosphere, but there still exists the danger of backflow of the tank atmosphere in the inert gas distribution system.

The usual way of guarding against such backflow of the storage tank atmosphere is to provide the inert gas distribution system with at least two non-return devices, one of which is a liquid seal valve, which comprises a liquid trap, usually a water trap, that permits inert gas to be delivered to the storage tank but prevents any backflow of the storage tank atmosphere even when the inert gas plant is shut down. Conventional liquid seal valves of this nature can be divided into three main types known respectively as the wet type, the semi-dry type and the dry type. A typical liquid seal valve of the wet type consists essentially of a vertical gas inlet pipe, connected to the inert gas plant, which dips beneath the surface of the liquid trap contained in an outer vessel. In normal operation, the inert gas bubbles through the shallow liquid trap and passes from the outer vessel to the storage tank(s). In the event of backflow of the storage tank atmosphere, the sealant liquid is forced back up the gas inlet pipe, the length of which is sufficient to overcome the maximum possible back-pressure developed in the storage tank(s).

A major problem with this wet type of liquid seal valve is the entrainment of liquid from the liquid trap when the valve is operating in its normal forward flow condition, which gives rise to corrosion of plant downstream of the liquid trap. The bubbling action of the inert gas produces atomised liquid which is difficult to disentrain unless the gas velocity in the outer vessel is kept low. Such a requirement necessitates an outer vessel of large diameter, and even then it is usually necessary to arrange auxiliary means, for example demister pads, downstream of the liquid trap.

In an attempt to overcome the disadvantages of the wet type of liquid seal valve, it has been proposed to shroud the lower end of the gas inlet pipe so that liquid-to-gas contact is reduced. A small liquid return pipe is connected through the shroud in order to reseal the gas pipe should the inlet pressure reduce. Unfortunately this liquid return pipe is a source of problems at higher gas flow rates, because gas flows through this pipe and causes severe liquid entrainment.

In order to reduce the amount of liquid entrainment, various forms of semi-dry and dry type liquid seal valves have been proposed. Although these generally result in a smaller degree of liquid entrainment than valves of the wet type, they have other disadvantages, such as more complicated and hence more expensive constructions and less reliability than valves of the wet type.

The present invention aims to provide an improved liquid seal valve which, to a high degree, eliminates the problem of liquid entrainment mentioned above.

According to the invention, a liquid seal valve comprises a first vessel having a gas outlet therefrom, a gas inlet pipe extending downwardly into a second vessel containing a liquid trap, the lower end of said gas inlet piep being disposed below the level of the surface of said liquid trap when there is no gas flow through said inlet pipe, said second vessel communicating in a region above said level with the first vessel, whereby gas entering the valve via said inlet pipe can flow via said second vessel to the gas outlet in the first vessel, and pipe means providing communication between the lower end of said gas inlet pipe and at least two regions in said first vessel of which at least one is below said level and at least one is above said level.

In a preferred embodiment of the liquid seal valve in accordance with the invention, the second vessel is an open-topped vessel disposed within the first vessel. The gas inlet pipe then passes downwardly through the upper part of the first vessel and through the open top of the second vessel. Preferably, both vessels are of circular cross-section, with the first vessel arranged concentrically around the second vessel and the gas inlet pipe having its longitudinal axis coaxial with the axes of the two vessels.

In use of the valve in accordance with the invention, the gas inlet pipe is connected to an inert gas plant and the gas outlet is connected to an inert gas distribution system for supplying the inert gas to one or more storage tanks. The liquid of the valve, usually water, is introduced continuously via a liquid inlet into the first vessel whence it flows via said pipe means into the second vessel and rises to the same level in both vessels. A weir in the first vessel determines the aforesaid level of the surface of the liquid trap when no gas flows through the valve (hereinafter referred to as the normal level of the liquid).

When inert gas flows down the inlet pipe, the pressure of the gas depresses the liquid level in the inlet pipe to the lower end thereof, the displaced liquid passing from the second vessel into the first vessel whence it flows over said weir to drain. The gas then flows out of the lower end of the inlet pipe and forces most of the liquid in the second vessel over into the first vessel, so that the liquid level in the second vessel is below the lower end of the inlet pipe, and the inert gas flows from the inlet pipe into the second vessel without passing through the liquid trap. So long as the gas velocity down the inlet pipe does not exceed a predetermined maximum value, said pipe means is at least partly filled with liquid and there is no flow of gas through the pipe means. Under these conditions, there is practically no entrainment of liquid by the gas flowing to the gas outlet.

If the velocity of the inert gas flowing down the inlet pipe is increased above said predetermined maximum value, liquid in said pipe means is forced out into the first vessel at said at least one region of the first vessel lying above the normal level of the liquid trap. While the main flow of inert gas still takes place via a dry region of the second vessel, a small proportion of the gas flow now takes place through the evacuated part of said pipe means, and again there is practically no entrainment of liquid by the gas flowing to the gas outlet.

If the velocity of the inert gas flowing down the inlet pipe is increased still further, a very small proportion of the inert gas can escape from said pipe means into the first vessel via said at least one region of the first vessel disposed below the normal level of the liquid trap. This results in a very small amount of liquid entrainment by this small proportion of the gas flow, but this can easily be removed by means of demister pads provided in the first vessel upstream of the gas outlet.

When the flow of inert gas is stopped, liquid flows back into said second vessel from the first vessel, via said pipe means, to re-establish the liquid seal at the lower end of the gas inlet pipe.

If a back-pressure develops in the first vessel, liquid will be forced up said inlet pipe, and again any liquid needed to maintain the normal level in the first vessel is supplied via the liquid inlet. When the back-pressure ceases, the liquid level falls in the gas inlet pipe to said normal level and excess liquid flows into the first vessel and over the weir to drain.

The invention will now be described, by way of example, with reference to the accompanying drawings, in which FIG. 1 is a schematic sectional side view of one embodiment of a water seal valve in accordance with the invention, and FIGS. 2 to 5 are views of the lower part of FIG. 1 showing different operational conditions thereof.

The valve shown in FIG. 1 comprises an outer first vessel 1 having an upper circular cylindrical wall portion 2, a lower circular cylindrical wall portion 3 of larger diameter than the portion 2 and a frusto-conical wall portion 4 connecting the lower end of the upper wall portion 2 to the upper end of the lower wall portion 3. The vessel 1 has a top 5 and a bottom 6.

Within the lower part of the vessel 1 is an inner second vessel 7 having a circular cylindrical wall 8 extending upwardly from the bottom 6 of the vessel 1. The wall 8 is concentric with the wall portion 3 of the vessel 1, there being an annular compartment 9 between the wall 8 and the wall portion 3.

A gas inlet pipe 10 extends vertically downwardly into the vessel 1 through its top 5, the lower open end 11 of the pipe 10 being situated in the vessel 7.

An open-ended pipe 12 is arranged in the annular compartment 9 with its lower end 13 close to the bottom 6 of the vessel 1. The upper end of this pipe is bent to form a short horizontal portion 14 having its open end 15 facing the wall portion 3 of the vessel 1. A horizontal branch pipe 16 is joined to the pipe 12 intermediate its upper and lower ends. The pipe 16 is radially disposed with respect to the vessel 1 and passes through the wall 8 of the vessel 7. At its radially inner end the pipe 16 has a short vertical portion 17 with its axis aligned with the axis of the inlet pipe 10. The upper open end 18 of the pipe portion 17 is at the same height as the lower open end 11 of the pipe 10.

A weir 19 secured to the inside of the wall portion 3 leads to a drain outlet 20 close to the bottom 6 of the vessel 1. The upper edge 21 of the weir is situated at a level above the lower end 11 of the inlet pipe 10 but below the upper edge of the wall 8.

A gas outlet 22 is provided in the wall portion 2 and a water inlet pipe 23 is connected to the wall portion 3 and leads to a water supply source (not shown) via a valve 24. The valve 24 is normally open so that a continuous flow of water passes into the lower part of the vessel 1 and fills the latter to the level of the upper edge 21 of the weir 19 (which is the aforementioned normal level of the water). This is the condition of the valve shown in FIG. 2, in which the water is at the same level, shown by the chain line 26, in the annular compartment 9 and in the vessel 7.

In use of the above described valve, the upper end of the gas inlet pipe 10 is connected to an inert gas plant and the gas outlet 22 is connected to an inert gas distribution system for distributing the inert gas to one or more storage tanks, for example cargo tanks of an oil tanker.

Figure 3:
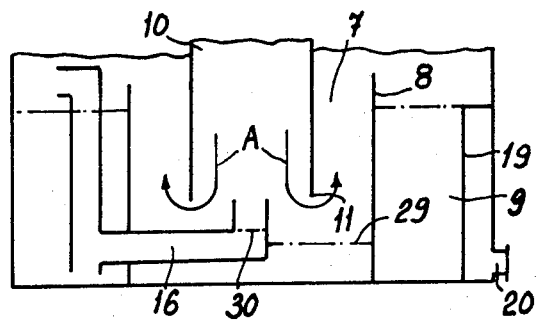

Referring now to FIG. 3, let it be assumed that inert gas is supplied at a low velocity (for example 20 to 25 m/second) to the pipe 10. This results in depression of the water level in the pipe 10 towards the lower open end 11 of the latter. The water displaced from the pipe 10 passes into the vessel 7 and flows over the upper edge of the wall 8 and then over the weir 19 to the drain outlet 20. At the instant when the water in the pipe 10 is depressed to the lower end 11 of the pipe, the column of water in the annular compartment between the pipe 10 and the wall 8 is forced upwardly by the gas stream and impinges on a baffle 34 (see FIG. 1) which directs it into the compartment 9. Gas is then free to flow out of the lower end 11 of the pipe 10, as indicated by the arrows A in FIG. 3, and passes to the gas outlet 22. This flow of gas drives more water from the vessel 7 into the annular compartment 9, so that the surface of the water in the vessel 7 is at the level indicated by the chain line 29 in FIG. 3. The inert gas flow then takes place through a dry region of the vessel 7. As a result, there is virtually no entrainment of water by the inert gas flow to the outlet 22. Any drops of water that are taken up by the gas flow are to a large extent removed by the baffle 34. Under these conditions, the pipe 16 is still full of water, but the level of the water in the vertical portion 17 has been depressed by the gas pressure to the level indicated by the chain line 30 in FIG. 3.

Figure 4:
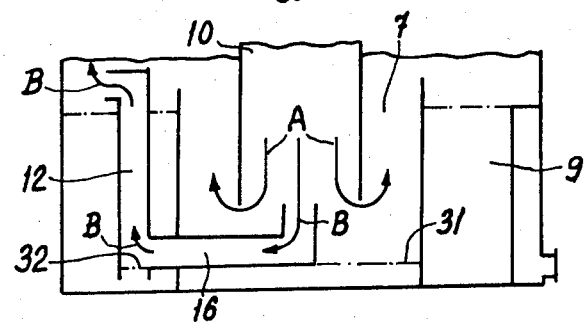

If the velocity of the inert gas is now increased to a higher value (for example about 30 m/second) the condition shown in FIG. 4 arises. Here the water in the pipe 16 and the upper portion of the pipe 12 is forced out by the gas pressure and inert gas flows not only through the vessel 7 (as indicated by the arrows A) but also through the pipe 16 and the upper part of the pipe 12 (as indicated by the arrows B). There is still virtually no entrainment of water by either of these gas flows, the water levels in the vessel 7 and the pipe 12 being indicated by the chain lines 31, 32, respectively.

Figure 5:
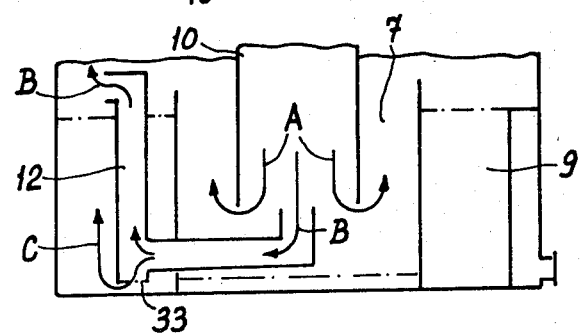

If the velocity of the inert gas is now increased to a very high value (for example in excess of 40 m/second)

the condition shown in FIG. 5 arises. Here the water in the lower part of the pipe 12 has been depressed to the level indicated by the chain line 33. The inert gas can now take a third path (indicated by the arrow C) through the water in the annular compartment 9. This, however, is a relatively minor proportion of the gas flow and results in only a very small amount of entrainment of water by the inert gas passing along this third path to the gas outlet 22. Demister pads 35 (see FIG. 1) in the upper part of the vessel 1 can easily remove this small amount of water from the inert gas flow.

Figure 2:
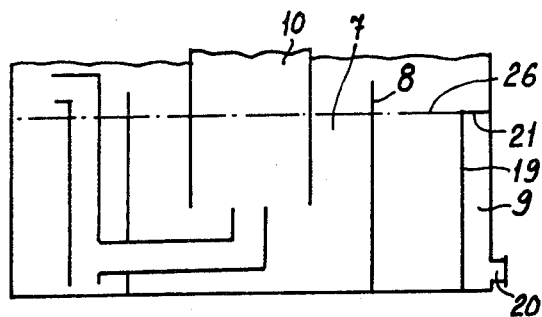

When the flow of inert gas is stopped, the condition shown in FIG. 2 is rapidly restored by the continuous introduction of water via the inlet 23, the water passing into the vessel 7 via the lower part of the pipe 12 and the pipe 16.

If, due to a rise in pressure in the storage tank(s) connected to the gas outlet 22, a back-pressure develops in the vessel 1, water can rise from the vessel 7 into the inlet pipe 10, for example to the level indicated by the chain line 36 in FIG. 1, to prevent the back-flow of gas from the storage tank(s) to the inert gas plant connected to the pipe 10. The necessary water for this purpose again flows automatically into the annular compartment 9 from the inlet 23 and from the compartment 9 to the vessel 7 via the lower part of the pipe 12 and the pipe 16.

What is claimed is:

1. A liquid seal valve comprising a first vessel having a lower part which includes a closed bottom and a wall extending upwardly from said bottom and a gas outlet from an upper part of the vessel, a second, open-topped vessel within the lower part of said first vessel, said second vessel having a wall extending to said closed bottom end spaced upwardly from said wall of the first vessel providing a radial gap between said walls of said first and second to vessels, a gas inlet pipe extending downwardly through said upper part of the first vessel and through the open top of said second vessel into a liquid trap in said second vessel, the lower end of said gas inlet pipe being disposed below the level of the surface said liquid trap when there is no gas flow through said inlet pipe, whereby gas entering the valve via said inlet pipe can flow via said second vessel to the gas outlet in said first vessel, and pipe means providing communication between the lower end of said gas inlet pipe and at least two regions in said first vessel, said pipe means including a first, open-ended pipe externally of, and to one side of, said second vessel, said first pipe being disposed in said radial gap and having a smaller cross-sectional area than said second vessel, said first pipe having a first open end below said level and a second open end above said level, and a second pipe connected to said first pipe intermediate the first and second open ends of the latter, said second pipe leading from said first pipe to the interior of said second vessel and having an open end opposite to, and adjacent to, the lower end of said gas inlet pipe.

2. A valve according to claim 1, in which both said vessels are of circular cross-section, with the first vessel arranged concentrically around the second vessel and said gas inlet pipe having its longitudinal axis coaxial with the axes of the two vessels.

3. A valve according to claim 2, in which said second pipe has a substantially vertical portion disposed below, and axially aligned with, said gas inlet pipe.

4. A valve according to claim 3, in which the vertical portion of said second pipe has a smaller cross-sectional area than said gas inlet pipe, and the upper end of said vertical portion is disposed at substantially the same level in said second vessel as the lower end of said gas inlet pipe.

5. A valve according to claims 1 or 2, comprising means for introducing liquid continuously via a liquid inlet into said first vessel whence it flows via said pipe means into said second vessel.

6. A valve according to claim 5, comprising a weir in said first vessel for determining said level of the liquid trap when no gas flows through said gas inlet pipe.

* * * * *

UNITED STATES PATENT AND TRADEMARK OFFICE
CERTIFICATE OF CORRECTION

PATENT NO. : 4,411,286
DATED : October 25, 1983
INVENTOR(S) : Gerald G. Ball

It is certified that error appears in the above—identified patent and that said Letters Patent is hereby corrected as shown below:

Column 2, line 27, change "piep" to --pipe--.

Column 5, line 34, change "end" to --and--;

line 34, change "upwardly" to --inwardly.

Column 6, line 1, after "surface" insert --of--.

Signed and Sealed this

Tenth Day of January 1984

[SEAL]

Attest:

Attesting Officer

GERALD J. MOSSINGHOFF

Commissioner of Patents and Trademarks